(12) United States Patent
Ishida et al.

(10) Patent No.: US 10,807,557 B2
(45) Date of Patent: Oct. 20, 2020

(54) AIRBAG DEVICE

(71) Applicant: TOYODA GOSEI CO., LTD., Kiyosu-shi, Aichi-ken (JP)

(72) Inventors: Ryotaro Ishida, Kiyosu (JP); Wataru Miura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 95 days.

(21) Appl. No.: 16/139,203

(22) Filed: Sep. 24, 2018

(65) Prior Publication Data
US 2019/0092269 A1 Mar. 28, 2019

(30) Foreign Application Priority Data
Sep. 28, 2017 (JP) ................................. 2017-188203

(51) Int. Cl.
| | | |
|---|---|---|
| *B60R 21/205* | (2011.01) | |
| *B60R 21/217* | (2011.01) | |
| *B60R 21/2334* | (2011.01) | |
| *B60R 21/237* | (2006.01) | |

(52) U.S. Cl.
CPC ........ *B60R 21/2334* (2013.01); *B60R 21/205* (2013.01); *B60R 21/217* (2013.01); *B60R 21/237* (2013.01); *B60R 2021/2375* (2013.01)

(58) Field of Classification Search
CPC .. B60R 21/205; B60R 21/217; B60R 21/2334
See application file for complete search history.

(56) References Cited

U.S. PATENT DOCUMENTS

| | | | | | |
|---|---|---|---|---|---|
| 5,542,692 | A | * | 8/1996 | Shaklik | B60R 21/217 280/728.2 |
| 5,570,899 | A | * | 11/1996 | Matsuo | B60R 21/23 280/728.2 |
| 5,642,900 | A | * | 7/1997 | Patel | B60R 21/217 112/475.08 |
| 5,683,100 | A | * | 11/1997 | Enders | B60R 21/217 280/728.2 |
| 5,727,810 | A | * | 3/1998 | Elqadah | B60R 21/217 280/728.2 |

(Continued)

FOREIGN PATENT DOCUMENTS

| | | |
|---|---|---|
| GB | 2270045 A | 3/1994 |
| JP | 3118974 B | 12/2000 |

*Primary Examiner* — Paul N Dickson
*Assistant Examiner* — Joselynn Y Sliteris
(74) *Attorney, Agent, or Firm* — Posz Law Group, PLC

(57) ABSTRACT

An airbag device includes an airbag provided with an inlet port of inflation gas, an inflator which includes gas outlet ports in an upper region of the body, a bag holder which is formed from synthetic resin and includes an insert opening for receiving the inflator body, and an airbag cover which includes a door openable at airbag deployment. The bag holder includes a support board which supports a bottom surface of the airbag as folded including a periphery of the inlet port, and a gas guide tube which extends upward from a periphery of the insert opening and is fitted in the inlet port of the airbag. The guide tube as fitted in the inlet port is greater in height than the upper region of the inflator body. The airbag further includes, in a vicinity of the bottom surface, a joint section which is joined to the support board.

10 Claims, 14 Drawing Sheets

(56) References Cited

U.S. PATENT DOCUMENTS

| | | | | |
|---|---|---|---|---|
| 5,992,874 | A | * | 11/1999 | Sugiyama ............... B60Q 5/003 280/728.2 |
| 6,042,147 | A | * | 3/2000 | Nishijima ............. B60R 21/217 280/731 |
| 6,089,600 | A | * | 7/2000 | Schenck ............... B60R 21/261 280/740 |
| 6,155,599 | A | * | 12/2000 | Bowers ................ B60R 21/217 280/728.2 |
| 6,422,600 | B1 | * | 7/2002 | Crohn .................. B60R 21/217 280/736 |
| 6,702,318 | B2 | * | 3/2004 | Rose .................... B60R 21/217 280/728.2 |
| 7,455,316 | B2 | * | 11/2008 | Andersson .......... B60R 21/2035 280/731 |
| 7,874,575 | B2 | * | 1/2011 | Fukuyama ........... B60R 21/217 280/728.2 |
| 2002/0125704 | A1 | * | 9/2002 | Heindl ................ B60R 21/2037 280/740 |
| 2004/0113405 | A1 | * | 6/2004 | Stricker ............. B60R 21/2037 280/736 |
| 2008/0265550 | A1 | * | 10/2008 | Lisseman ............. B60R 21/261 280/728.2 |
| 2010/0045003 | A1 | * | 2/2010 | Mills .................... B60R 21/217 280/728.2 |

* cited by examiner (A)

(B)

AIRBAG DEVICE

CROSS REFERENCE TO RELATED APPLICATIONS

The present application claims priority from Japanese Patent Application No. 2017-188203 of Ishida et al., filed on Sep. 28, 2017, the entire disclosure of which is incorporated herein by reference.

BACKGROUND OF THE INVENTION

1. Field of the Invention

The present invention relates to an airbag device for automobiles which is light in weight.

2. Description of Related Art

Weight reduction of airbag devices has been sought for JP 3118974 B discloses an airbag device which employs a retainer fabricated from synthetic resin for the purpose of weight reduction. A retainer is used to hold an airbag and mount the same on a vehicle body structure, and can also be called "bag holder" or "case". The airbag device includes an airbag, an inflator for feeding the airbag with an inflation gas, a ring which is fabricated from synthetic resin, and the bag holder (i.e. retainer). The inflator includes a body which is provided with a plurality of gas discharge ports in the upper region, and a flange which protrudes from the outer circumference of the body. The bag holder includes an insert opening for receiving the inflator body. The ring is attached to the periphery of a gas inlet port of the airbag, and further welded to the periphery of the insert opening of the bag holder. The airbag receives the upper region of the inflator body having the gas discharge ports with the gas inlet port, via the insert opening of the bag holder from below. The inflator is also provided with a ring of synthetic resin on the upper surface of the flange, and the ring is welded to the periphery of the insert opening on the underside of the bag holder, such that the inflator is coupled to the bag holder.

The above airbag device accomplishes weight reduction through the use of a bag holder (or retainer, or case) made from synthetic resin instead of metal such as sheet metal. However, in order to ensure a gas tightness of the gas inlet port, the airbag device requires the ring which is attached to the periphery of the gas inlet port in advance, and then welded to the periphery of the insert opening of the bag holder. Since this configuration is complicated, an improved configuration is sought for ensuring a gas-tight connection between the airbag and a synthetic-resin bag holder.

SUMMARY OF THE INVENTION

The present invention contemplates the above-mentioned problem, and has an object to provide an airbag device that employs a synthetic-resin bag holder and has a simple and gas-tight connection between the bag holder and an airbag.

The airbag device of the invention mountable on a vehicle includes:

an airbag that is folded up and inflatable with an inflation gas, the airbag including a generally round inlet port for taking in the inflation gas, the inlet port being disposed in a bottom surface of the airbag as folded, the airbag further including a joint section that is disposed in a vicinity of the bottom surface;

an inflator for feeding the airbag with the inflation gas, the inflator including a pot-shaped body and a plurality of gas outlet ports that are disposed on an outer circumference of an upper region of the body, the upper region of the body being fitted in the inlet port of the airbag;

an airbag cover that covers the airbag and includes a door which is openable so as to permit emergence of the airbag; and a bag holder that is formed from synthetic resin and supports the airbag, the bag holder being coupled with the inflator and comprising:

a support board that supports the bottom surface of the airbag including the periphery of the inlet port and is coupled with the joint section of the airbag;

an insert opening that is disposed in the support board for receiving the upper region of the body of the inflator from below such that the upper region is further inserted into the inlet port of the airbag; and a generally tubular gas guide tube that extends upward towards the airbag cover from a periphery of the insert opening, the gas guide tube being fitted into the airbag via the inlet port and covering the outer circumference of the upper region of the body of the inflator at a distance such that the inflation gas exiting the gas outlet ports of the inflator is allowed to flow upward, the gas guide tube being greater in height than the upper region of the body of the inflator.

With the airbag device of the invention, when an inflation gas is emitted from the gas outlet ports of the inflator, the gas passes by the upper end of the body of the inflator and flows towards the airbag cover inside the gas guide tube of the bag holder, and once fills a space defined by the gas guide tube, an upper end face of the body of the inflator and an upper end of the gas guide tube. When more inflation gas is emitted from the inflator, the gas pushes up a portion of the airbag disposed above an opening of the gas guide tube. The portion of the airbag as pushed up then opens the doors of the airbag cover, emerges from an opening formed by opening of the doors, then the airbag unfolds and is deployed.

Since the gas guide tube of the bag holder is fitted in the inlet port of the airbag, the gas guide tube lids the inlet port and prevents gas leakage from the inlet port at airbag deployment. Further, the joint section of the airbag, which is disposed in a vicinity of the bottom surface of the airbag as folded, is joined to the support board of the bag holder, thus prevented from being detached from the support board. With this configuration, at airbag deployment, although the inlet port of the airbag may move in a direction away from the support board to some extent, it merely slides on the outer circumference of the gas guide tube and stays closed off by the gas guide tube, thus a gas leakage is prevented. Moreover, the gas guide tube has a greater height from the support board than the body of the inflator as fitted in the inlet port. This configuration will prevent the inlet port from slipping off from the gas guide tube. Accordingly, a gas leakage from the inlet port will be prevented adequately, and a gas sealing property of the inlet port of the airbag will be ensured with a simple configuration.

That is, in the airbag device of the invention, the gas sealing property of the airbag is ensured by the tight-fitting of the gas guide tube of the bag holder into the inlet port, and the joint of a portion in the vicinity of the bottom surface of the airbag as folded with the support board of the bag holder. With respect to the joint between the airbag and bag holder, it is not necessary to join and seal a whole periphery of the inlet port to the support board, but the airbag has only to be joined to the support board by a part of the bottom surface so as not to be separated from the support board considerably. Accordingly, the joint may be composed of a binding of the support board by a suitable strap or belt, an engagement of suitable joint tongues with the support board, or the like.

The configuration that the gas guide tube is greater in height than the body of the inflator as inserted into the inlet port and surrounds the outer circumference of the body of the inflator body enhances a heat resistance of the airbag because an inflation gas exiting the gas outlet ports of the inflator does not hit the airbag directly but hits an inner circumference of the gas guide tube first.

Therefore, the airbag device of the invention has a simple and gas-tight connection between the airbag and the bag holder made from synthetic resin. The airbag is also enhanced in heat resistance.

In the airbag device of the invention, it is desired that the support board of the bag holder is provided with a reinforcing rib for enhancing bending rigidity. Such a reinforcing rib will provide the support board of the bag holder with a high bending rigidity, such that the support board will support the bottom surface of the airbag as folded steadily and steady an airbag deployment.

In the airbag device of the invention, moreover, it is desired that the joint section of the airbag includes a root region that is joined to the periphery of the inlet port of the airbag and a plurality of leading end regions which are joined to the support board at more than one positions in a vicinity of the inlet port of the airbag.

With this configuration, when the airbag is inflated with an inflation gas and the inlet port slides on the outer circumference of the gas guide tube in a direction away from the support board, the joint section, which is joined to the support board by the leading end regions, will pull the periphery of the inlet port. This will form, in the periphery of the inlet port, a removed region which is removed from the support board and an approximate region which is close to the support board, such that a circumferential length of the periphery of the inlet port will be lengthened and the inner circumference of the inlet port will be substantially pulled and constricted. As a consequence, the periphery of the inlet port will be further pressed against the outer circumference of the gas guide tube. That is, the joint section of the airbag will help pull the periphery of the inlet port further towards the outer circumference of the gas guide tube, thereby improving the gas sealing property of the inlet port.

In the above instance, it is desired that: the inflator includes a flange that protrudes from the outer circumference of the body; the bag holder includes a plurality of screw members that protrude downwardly from the periphery of the insert opening of the support board; and the screw members are each in engagement with the leading end regions of the joint section of the airbag and passed through the flange, and fastened with nuts.

With this configuration, when the joint section of the airbag is coupled with the support board of the bag holder during an assembling work of the airbag device, the joint section is firstly brought into engagement with the screw members, then the screw members are passed through the flange of the inflator and fastened with the nuts. Thus the airbag (particularly, the joint section) and the support board as well as the inflator and support board are coupled together. That is, the screw members are used for joint of the airbag to the support board of the bag holder as well as for joint of the inflator to the bag holder, which simplifies the configuration of the airbag device, and improves efficiency in the assembling work of the airbag device.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
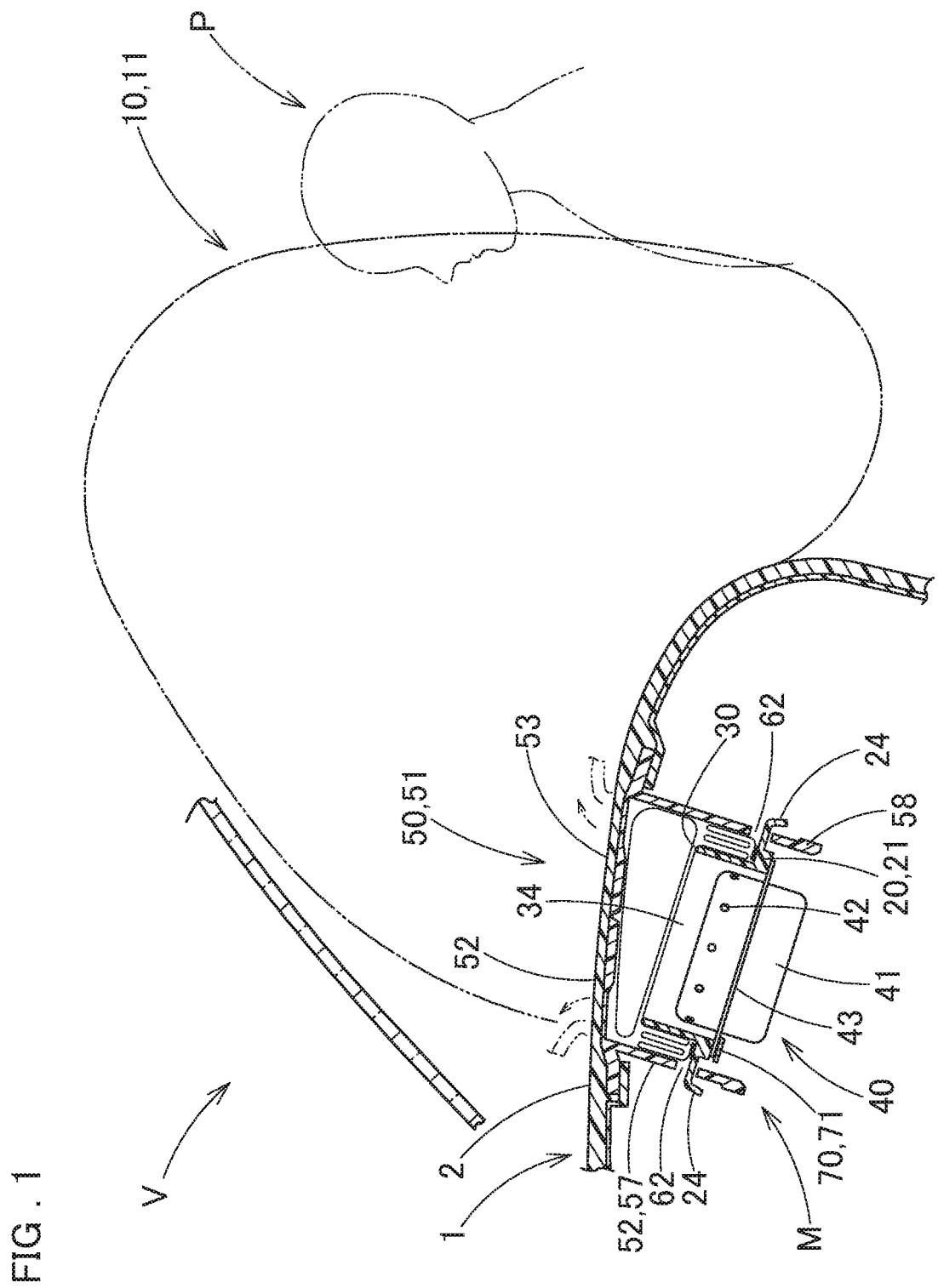
FIG. 1 is a schematic vertical sectional view of an airbag device for a passenger seat embodying the invention as mounted on a vehicle, taken along a front and rear direction.

As shown in FIG. 1, an airbag device M embodying the invention is an airbag device M for a passenger seat which is mountable in a top plane 2 of an instrument panel (or dashboard) 1 in front of a passenger seat of a vehicle V. As shown in FIGS. 1 to 4, the airbag device M includes an airbag 10, a bag holder 20, an inflator 40 for supplying the airbag 10 with an inflation gas, and an airbag cover 50 composed of a portion of the dashboard 1.

Unless otherwise specified, front/rear, up/down and left/right directions in this specification are intended to refer to front/rear, up/down and left/right directions of the vehicle V.

As shown in FIGS. 1 to 4 and 8, the airbag 10 includes a body 11 which is inflatable with an inflation gas for protecting a passenger P sitting in the passenger seat, and a joint section 15 which is used to mount the bag body 11 on the bag holder 20. The bag body 11 is provided with a round inlet port 12 for taking in an inflation gas.

Figure 8:
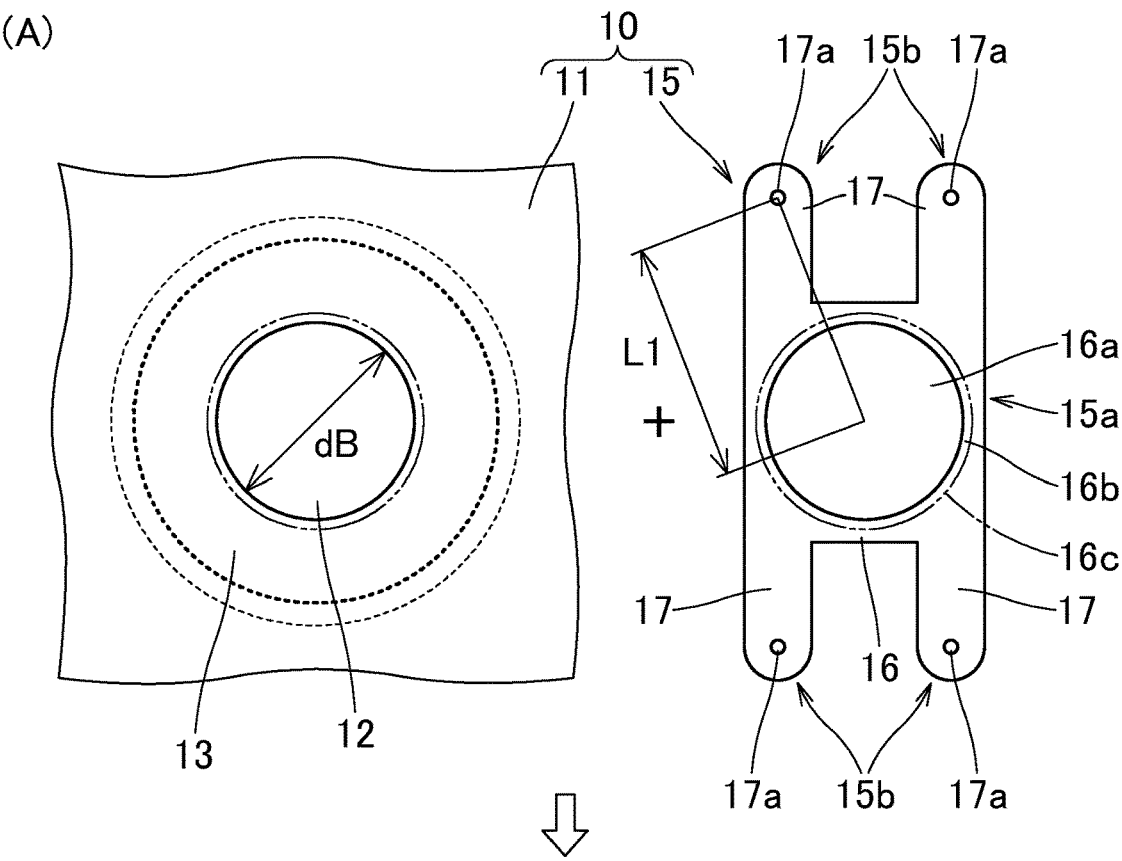
FIG. 8 illustrates the way the joint section is joined to an airbag body.
Figure 8:
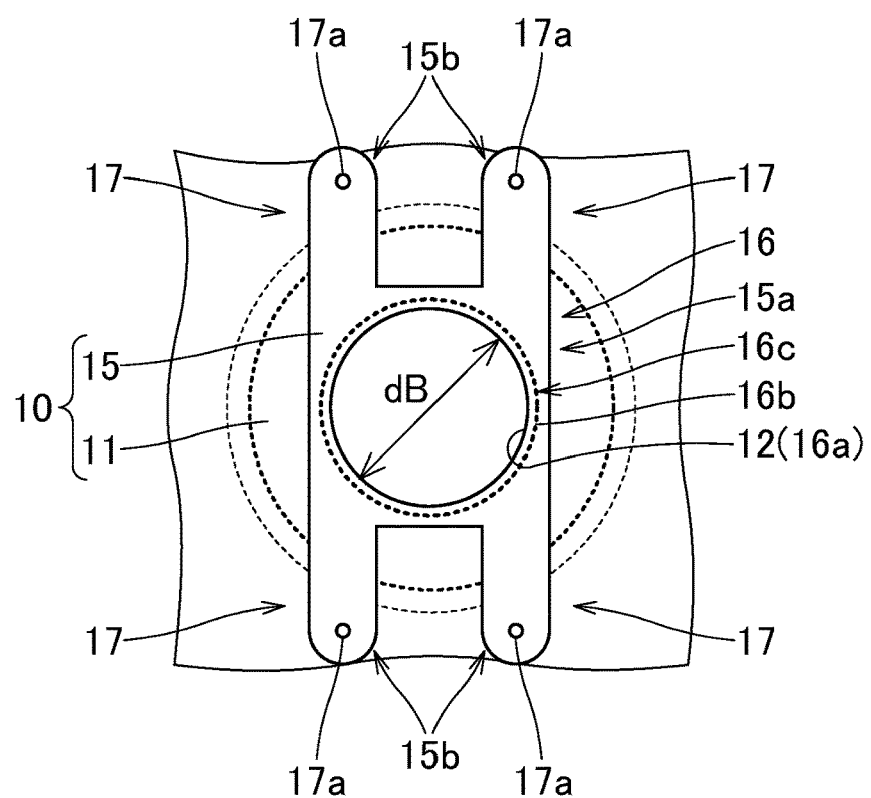
Figure 9:
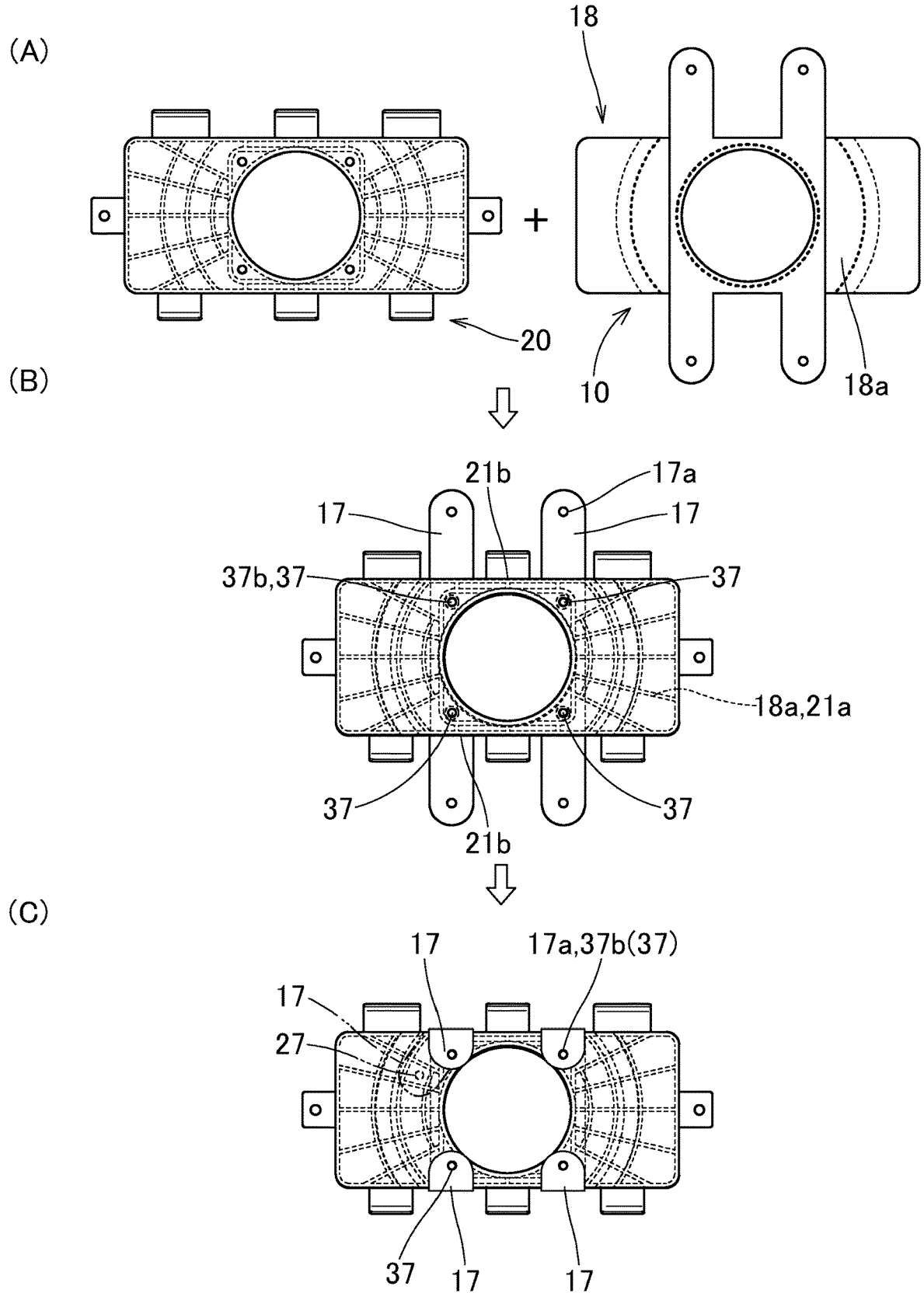
FIG. 9 illustrates an assembling of the airbag and bag holder in a view from below the airbag and bag holder.
Figure 10:
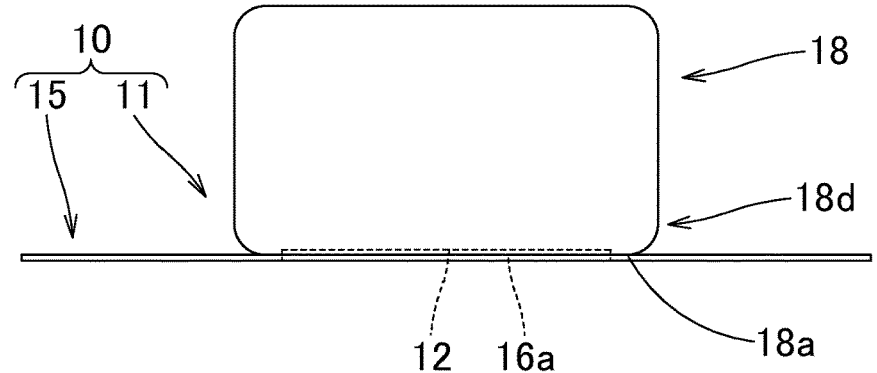
FIGS. 10 and 11 illustrate an assembling of the airbag device of the embodiment.
Figure 10:
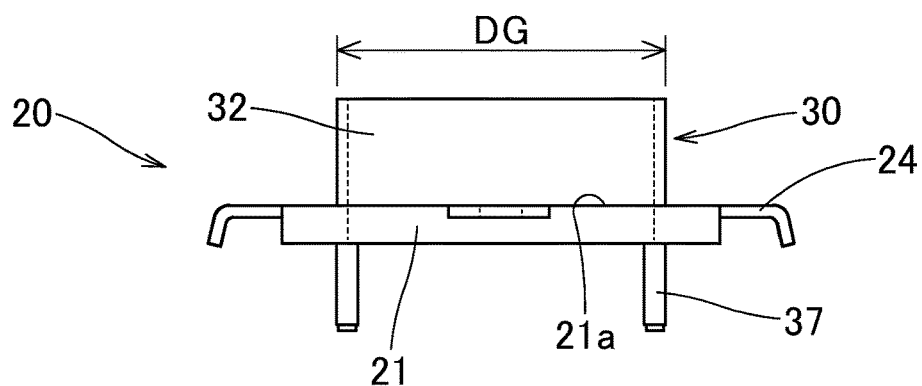
Figure 10:
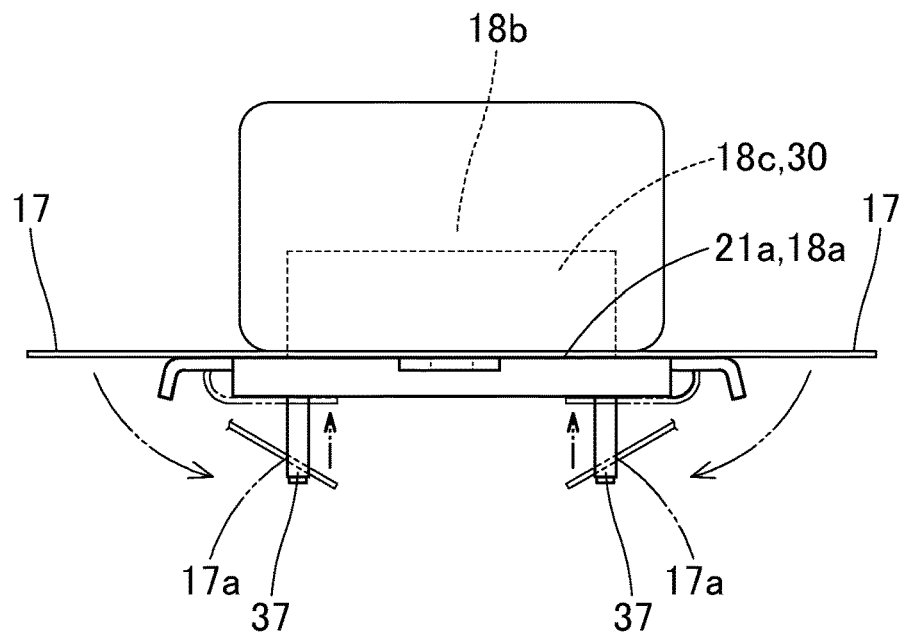

Referring to FIG. 8, the joint section 15 is sewn and joined to a periphery 13 of the inlet port 12 on the outer surface of the bag body 11 by the root region 15a. The joint section 15 as well as the bag body 11 is formed of a flexible fabric woven of polyamide yarn or the like. The joint section 15 includes a central region 16 (or root region 15*a*) which is joined to the periphery 13 of the inlet port 12 and four joint tongues 17 which extend in a front and rear direction from left and right portions of each of the front and rear edges of the central region 16 and surround the inlet port 12, as shown in FIG. 8. Each of the joint tongues 17 is provided, at the leading end (i.e. at the leading end region 15*b* of the joint section 15), a retaining hole 17*a* which receives and is brought into engagement with a later-described screw member 37 protruding downwardly from the bag holder 20, as shown in FIGS. 9 and 10. The central region 16 is provided with a round opening 16*a* which is identical to the inlet port 12 of the bag body 11, and the periphery 16*b* of the opening 16*a* is joined to the periphery 13 of the inlet port 12 with a seam 16*c*.

The joint section 15 as laid flat has such a generally H shape that the central region 16 is generally rectangular and the four joint tongues 17 extend from the central region 16 in the front and rear direction in such an arrangement that each forms a tangent to the opening 16*a* of the central region 16.

When a later-described gas guide tube 30 of the bag holder 20 is fitted in the inlet port 12 as described later, the joint tongues 17 are each bent so as to wrap the front and rear edges 21*b* of a later-described support board 21 and brought into engagement with the screw members 37 by the retaining holes 17*a*, as shown in FIG. 10. The size of the joint section 15, in other words, a dimension L1 (FIG. 8) from the central region 16 to the retaining hole 17*a* of the joint section 15 is so determined that the periphery 13 of the inlet port 12 is brought into contact with the support board 21 when the joint tongues 17 are in engagement with the screw members 37.

Figure 6:
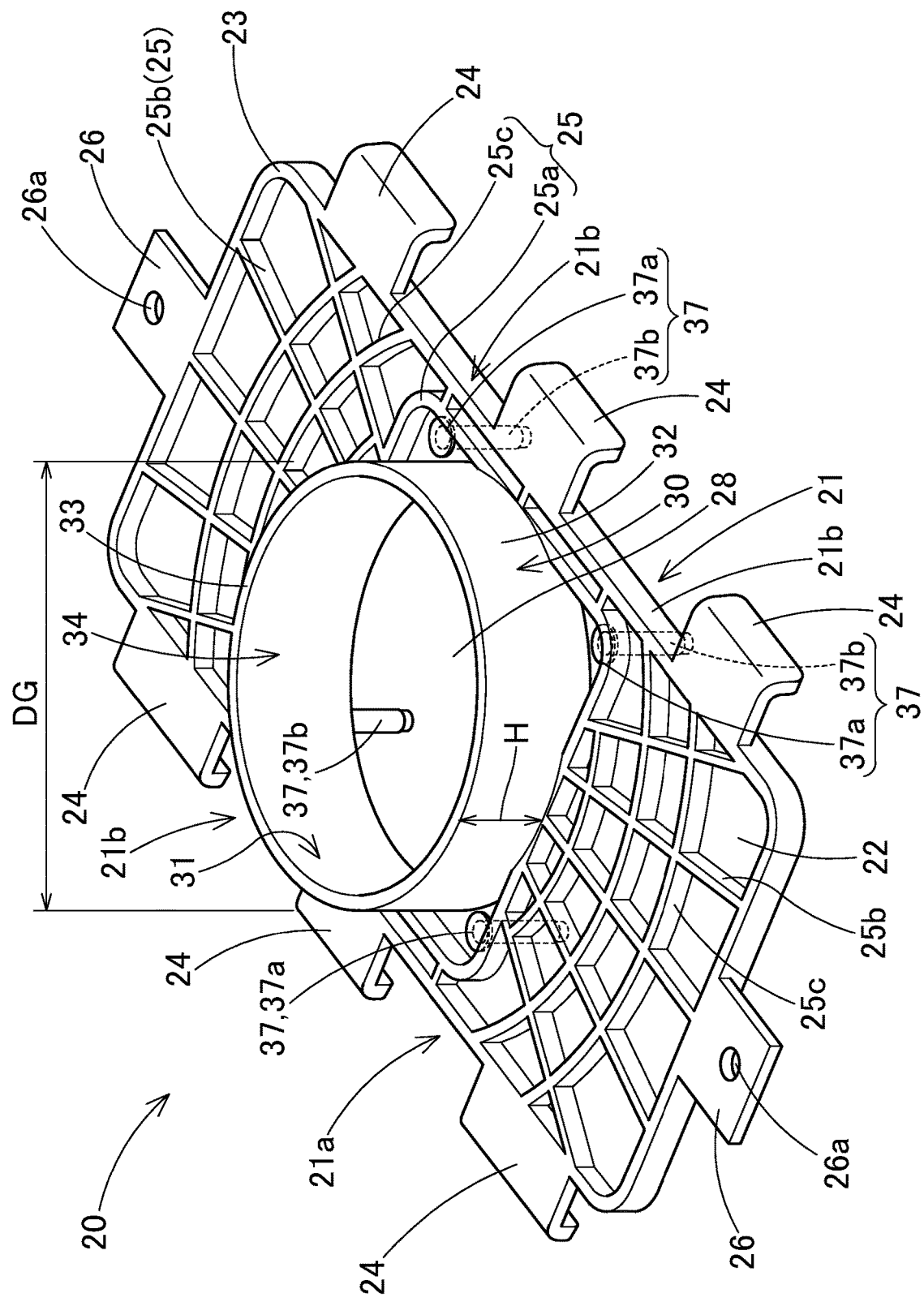
FIG. 6 is a perspective view of the bag holder of the embodiment.
Figure 7:
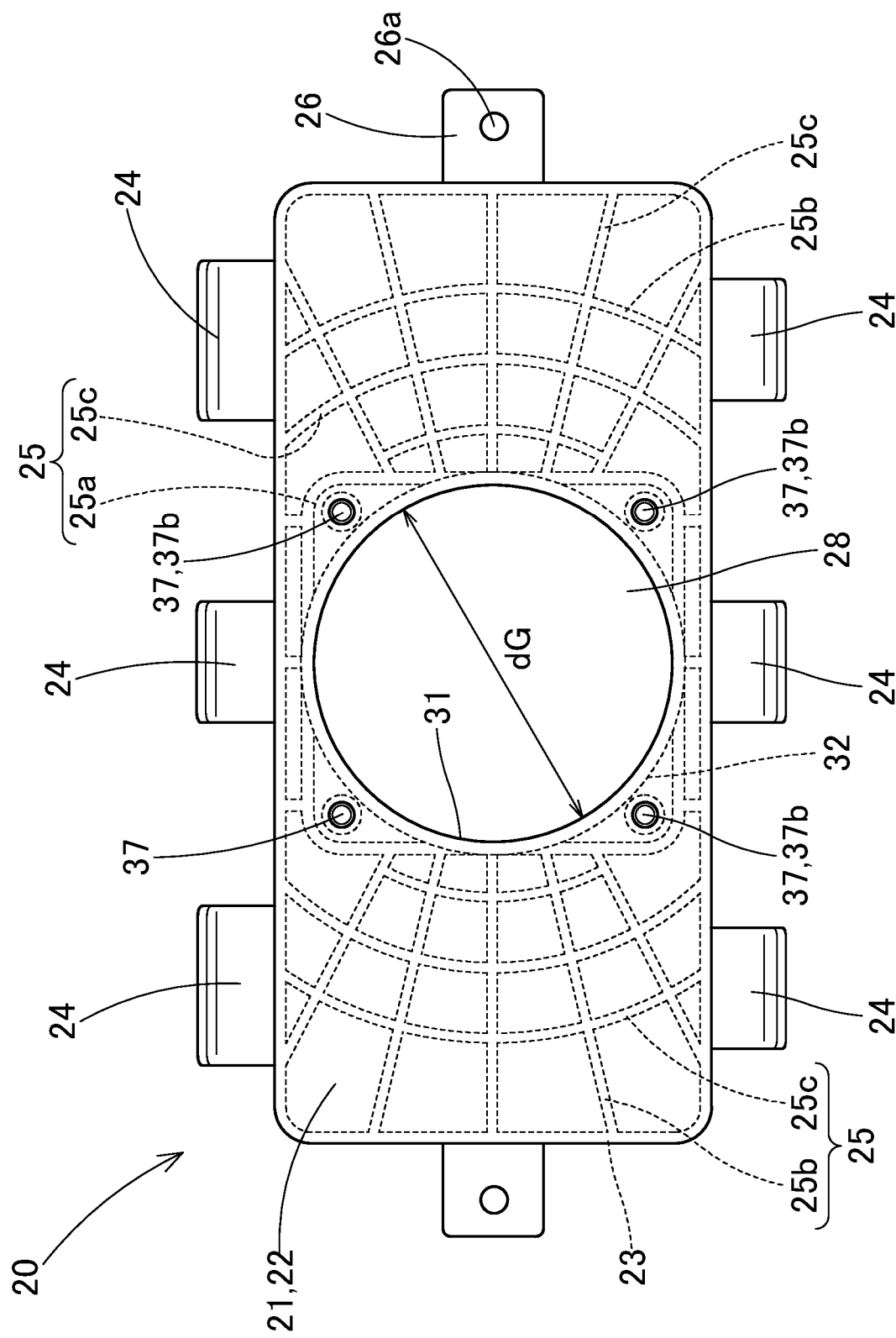
FIG. 7 is a bottom view of the bag holder of the embodiment.

The bag holder 20 is fabricated from such synthetic resin as polyamide reinforced by glass fiber or the like as appropriate. Referring to FIGS. 6 and 7, the bag holder 20 includes a support board 21 which is formed generally into a rectangular plate, and a gas guide tube 30 which is tubular in shape. The support board 21 includes, at the center, a round insert opening 28 for receiving a later-described body 41 of the inflator 40 from below. The gas guide tube 30 extends upward from the edge of the insert opening 28 on the upper surface 21*a* of the support board 21.

The support board 21 includes a board region 22 which has a generally rectangular plate shape, a peripheral region 23 which rises from the outer circumferential edge of the board region 22, and a plurality of reinforcing ribs 25 which protrude from the upper surface of the board region 22 for enhancing a bending rigidity of the board region 22. The reinforcing ribs 25 include three kinds of ribs; a square frame rib 25*a* which encircles the gas guide tube 30 in the shape of a generally square tube, a plurality of radial ribs 25*b* which extend radially from the square frame rib 25*a*, and a plurality of arcuate ribs 25*c* which encircle the gas guide tube 30 in a concentric fashion. The three kinds of ribs 25*a*, 25*b* and 25*c* intersect one another.

The support board 21 further includes, at front and rear regions of the peripheral region 23, three each retaining hooks 24 each of which extends outwardly towards the front and rear. Each of the retaining hooks 24 is inserted into a later-described retaining hole 62 of a side wall 56 of the airbag cover 50 and retains the side wall 56.

Figure 4:
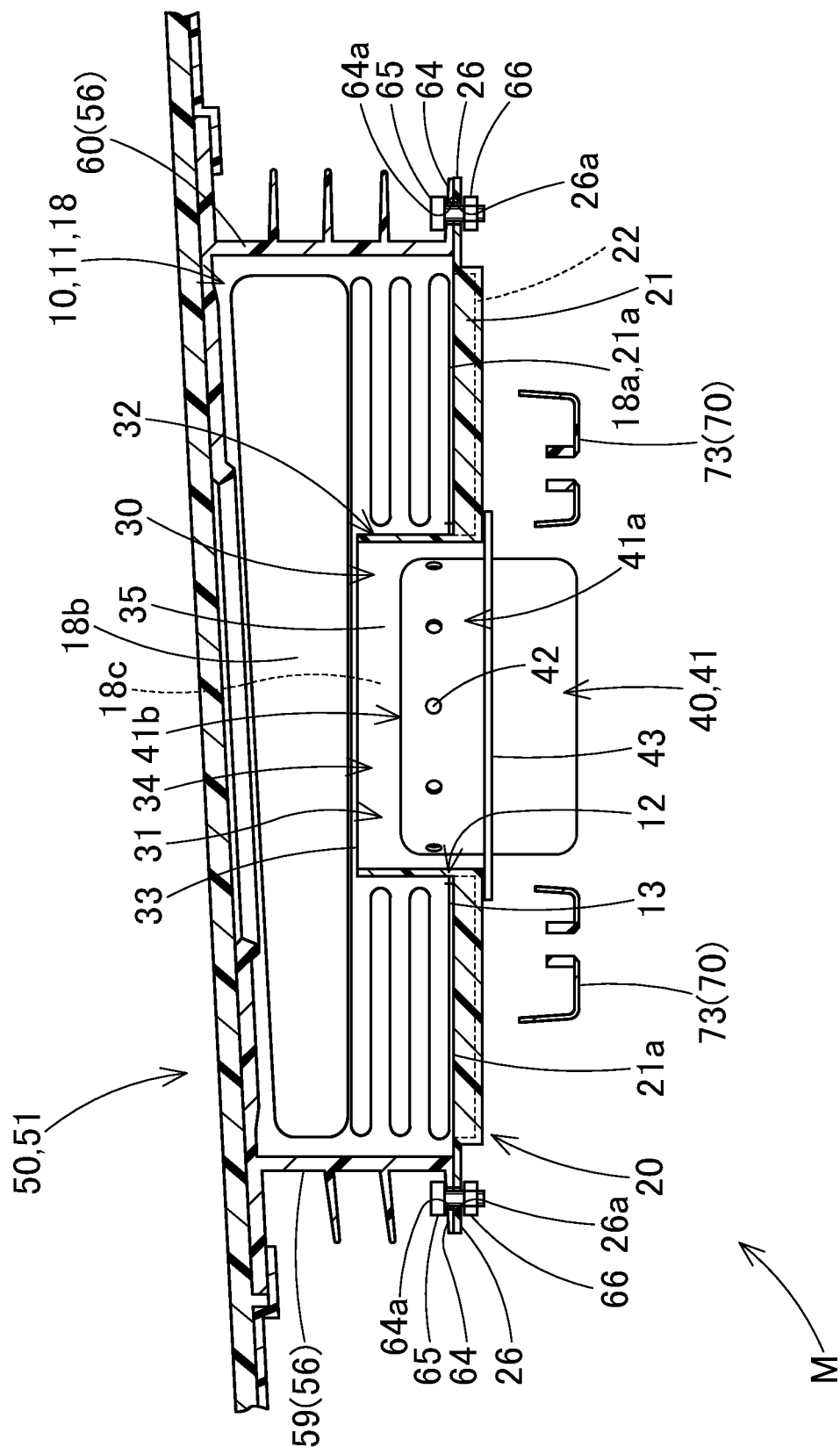
FIG. 4 is a schematic enlarged vertical sectional view of the airbag device of FIG. 1 taken along a left and right direction.

The support board 21 is further provided, at the left and right sides, with joint tongues 26 which extend outwardly towards the left and right from the peripheral region 23. Each of the joint tongues 26 is adapted to be coupled with a mounting seat 64 of the side wall 56 of the airbag cover 50, as shown in FIG. 4, and provided with an insert hole 26*a* for receiving a screw 65 which couples the joint tongue 26 and mounting seat 64 together.

Referring to FIGS. 6 and 7, the support board 21 further includes, between the gas guide tube 30 and the square frame rib 25*a* on the board region 22, a plurality of (four, in the illustrated embodiment) screw members 37 of metal which are disposed around the insert opening 28 in an equally spaced fashion and protrude downwardly. The screw members 37 are respectively brought into engagement with the joint tongues 17 of the joint section 15 of the airbag 10 and mount the airbag 10 on the support board 21 and further on the inflator 40. In the illustrated embodiment, each of the screw members 37 is so arranged that the head 37*a* is adhered to the upper surface of the board region 22 while the shank 37*b* protrudes downwardly from the board region 22.

Figure 2:
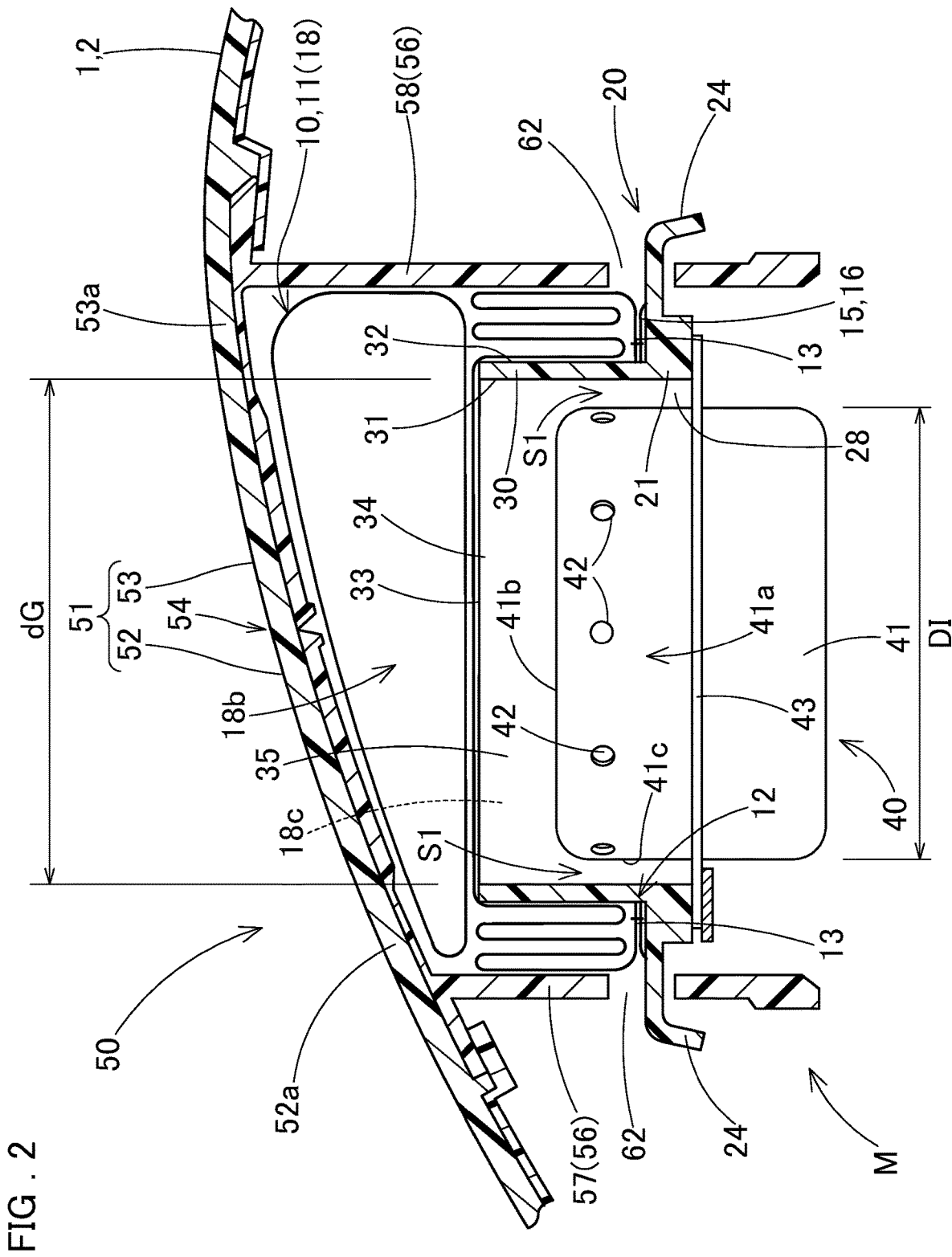
FIG. 2 is a schematic enlarged vertical sectional view of the airbag device of FIG. 1 taken along the front and rear direction.

The gas guide tube 30 is formed into a tube that extends upwardly from the edge of the insert opening 28 in the board region 22 of the support board 21. The gas guide tube 30 has such an outer diameter DG (FIG. 6) that fits in the inlet port 12 of the airbag 10 and such an inner diameter dG that would form a predetermined space S1 between the inner surface and the outer surface 41*c* of the inflator body 41 as inserted into the insert opening 28 such that an inflation gas will be allowed to flow upward through the space S1, as shown in FIG. 2. That is, the outer diameter DG of the gas guide tube 30 on the part of the outer circumference 32 is identical to, or slightly greater than an inner diameter dB (FIG. 8) of the inlet port 12 such that the gas guide tube 30 fits in the inlet port 12. The inner diameter dG of the gas guide tube 30 on the part of the inner circumference 31 is identical to an opening diameter of the insert opening 28 of the support board 21, and greater than an outer diameter DI (FIG. 2) of the inflator body 41 by a double of the space S1.

The height H1 (FIG. 6) of the gas guide tube 30 from the support board 21 to the upper end 33 is such that the upper end 33 is disposed above an upper end face 41*b* of the inflator body 41 as coupled with the support board 21.

Figure 3:
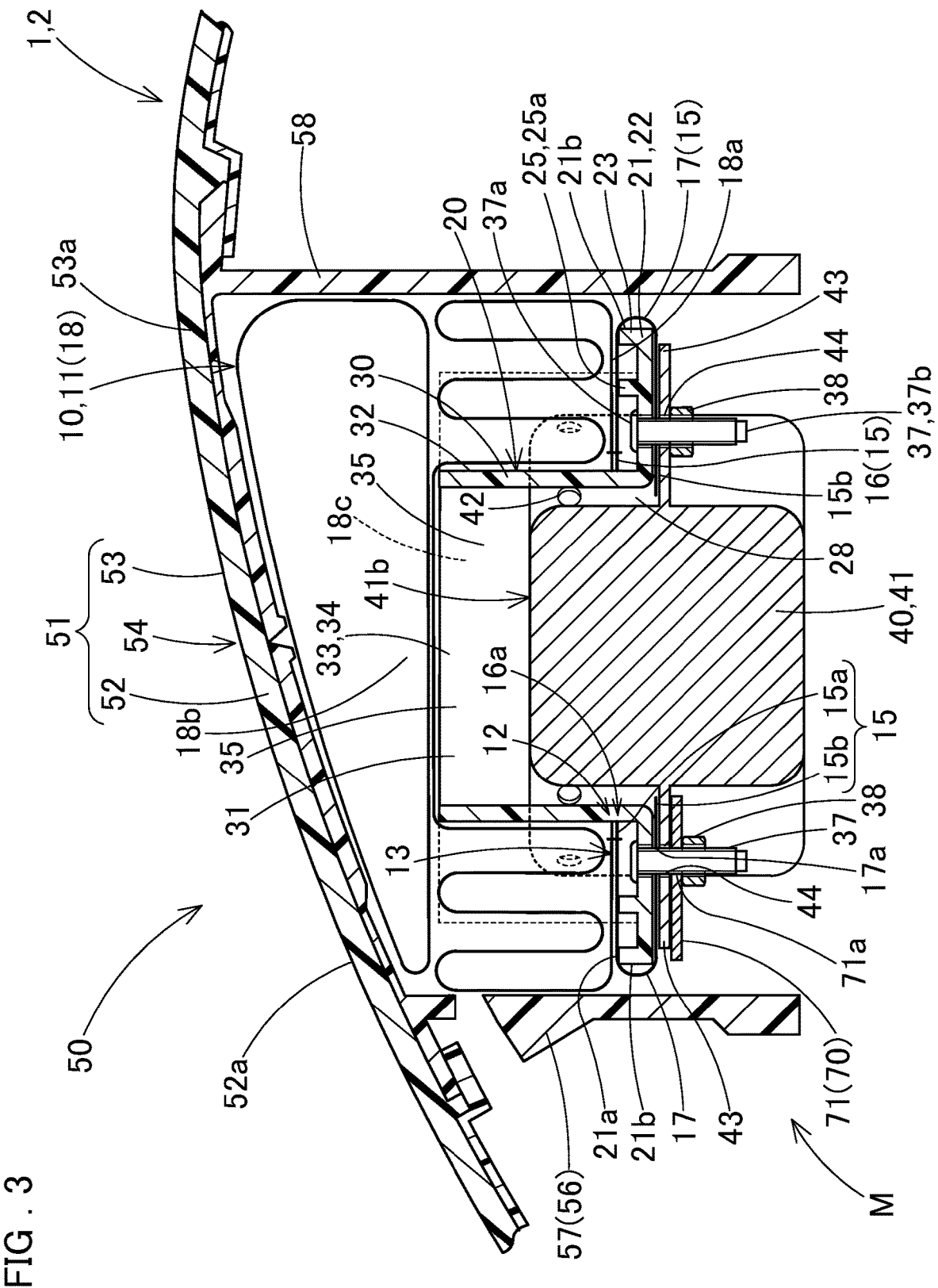
FIG. 3 is a schematic enlarged vertical sectional view of the airbag device of FIG. 1 taken along the front and rear direction, especially showing a connection between a joint section of an airbag and a bag holder.

As can be seen in FIGS. 2 to 4, the inflator 40 includes a pot-shaped body 41 which feeds the airbag 10 with an inflation gas and a flange 43 which has a square plate (or square annular) shape and disposed on the outer circumference of the body 41. The inflator 40 is provided, on the outer circumference 41*c* of an upper region 41*a* of the body 41 above the flange 43, a plurality of radially arranged gas outlet ports 42. The gas outlet ports 42 discharge an inflation gas in a direction perpendicular to an axial direction of the body 41, in the space S formed between the gas guide tube 30 and the outer circumference of the upper region 41*a* of the inflator body 41, as described above. The gas is then redirected by the gas guide tube 30 and flows towards an opening 34 formed at the upper end 33 of the gas guide tube 30.

The flange 43 of the inflator 40 is provided, at four corners, with one each through hole 44 for receiving the screw member 37. The inflator body 41 is inserted into the airbag 10 via the insert opening 28 of the bag holder 20 and inlet port 12 of the airbag 10 such that the screw members 37 of the bag holder 20 go through the through holes 44, and the screw members 37 are nut 38 fastened. Thus the inflator 40 is coupled with the support board 21 of the bag holder 20.

As can be seen in FIGS. 2 to 4, the airbag cover 50 covers the airbag 10 (or airbag package 18) as folded up and disposed on the support board 21 of the bag holder 20 from above and side. The airbag cover 50 is disposed on the top plane 2 of the dashboard 1 and composed of a part of the dashboard 1. The airbag cover 50 includes a ceiling wall region 51 which covers the airbag 10 from above, and the ceiling wall region 51 is provided with two doors 52 and 53 which are designed to open forward and rearward when pushed by the airbag 10 upon airbag deployment. The doors 52 and 53 are defined by a thinned tearable region 54 which has a generally H shape as viewed from above. When the tearable region 54 tears when pushed by the airbag 10 being inflated, the doors 52 and 53 open around hinges 52a and 53a which are disposed at ends in a front and rear direction.

The airbag cover 50 further includes, around the doors 52 and 53, a side wall 56 which extends downwardly in a square tubular shape. The side wall 56 includes a front region 57 and a rear region 58 which are opposed to each other in a front and rear direction, and a left region 59 and a right region 60 which are opposed to each other in a left and right direction. Each of the front region 57 and rear region 58 is provided with three each retaining holes 62 for engagement with the retaining hooks 24 of the bag holder 22. Each of the left region 59 and right region 60 is provided with a mounting seat 64 which is coupled with the joint tongue 26 of the bag holder 20 with the screw 65. The mounting seat 64 is provided with a through hole 64a for receiving the screw 65.

Figure 5:
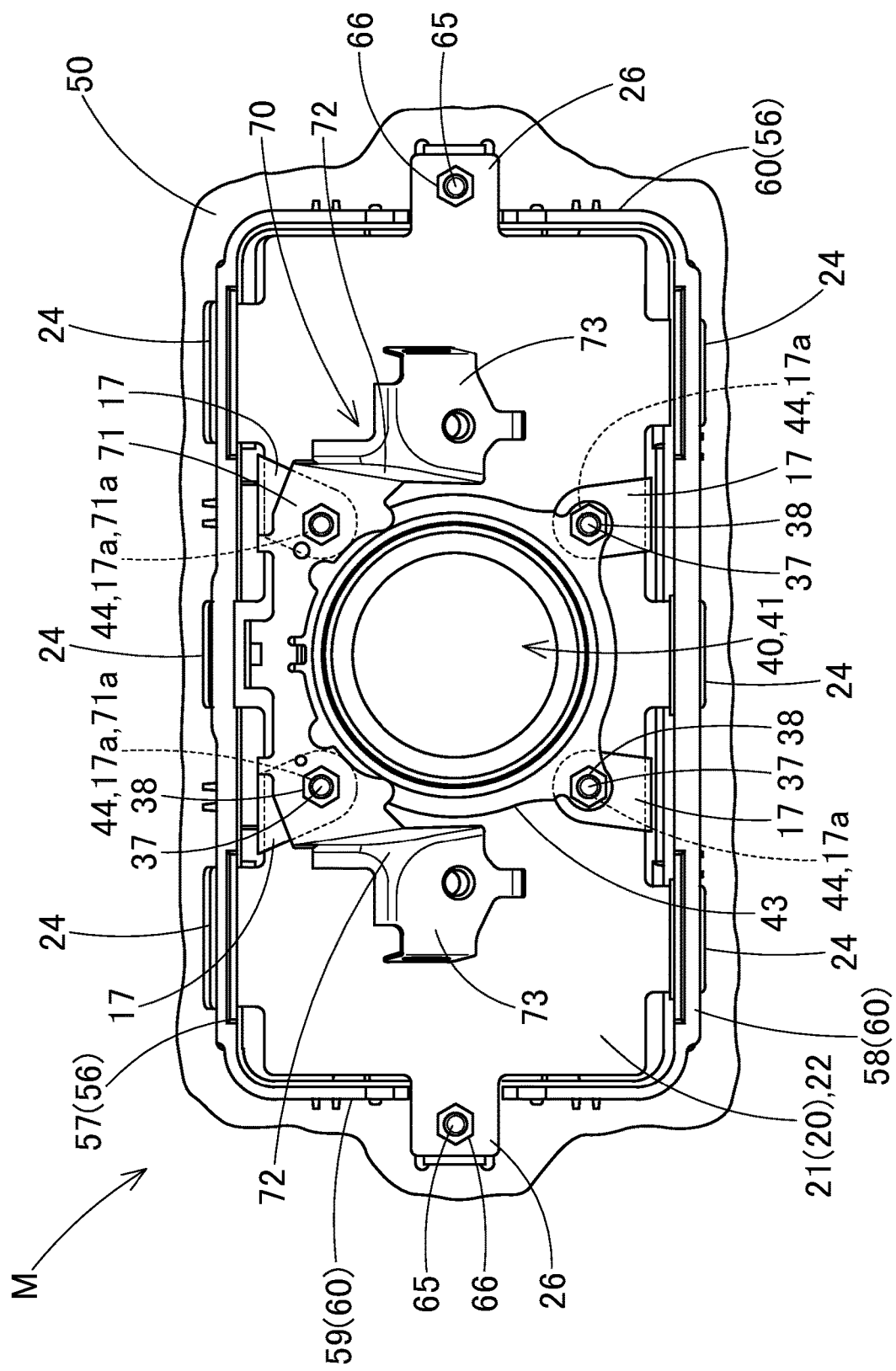
FIG. 5 is a schematic bottom view of the airbag device of FIG. 1.
Figure 11:
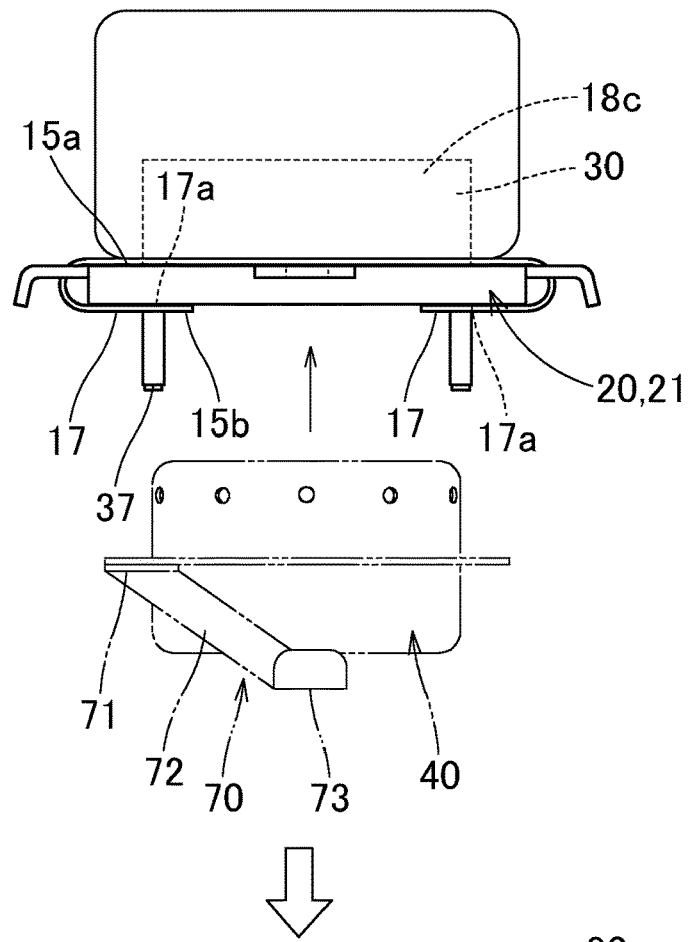
Figure 11:
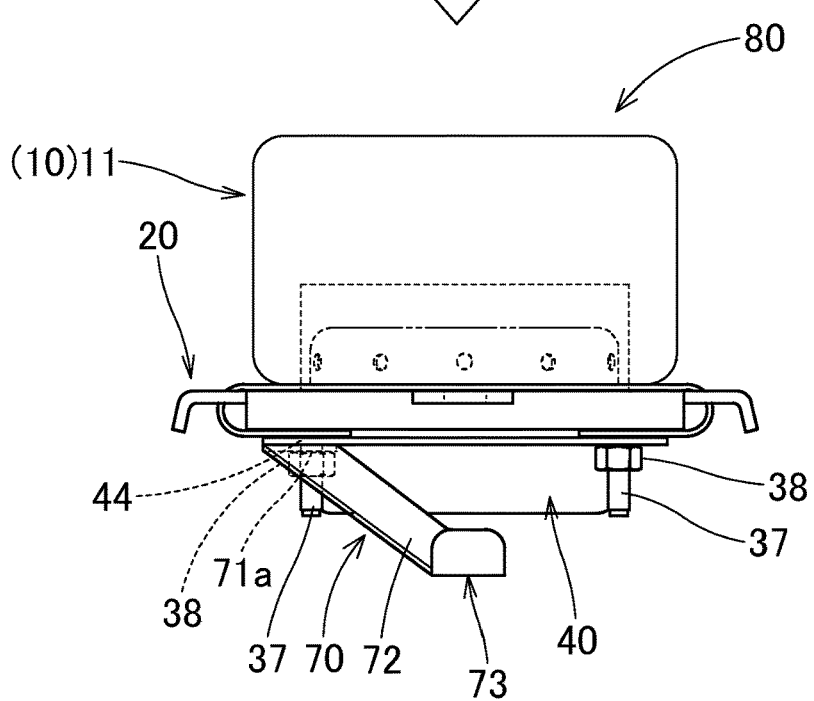

The airbag device M of the illustrated embodiment further includes a joint bracket 70 which is used to mount the airbag device M on a not-shown dashboard reinforcement of the vehicle V. The joint bracket 70 is coupled to the bag holder 20 through the use of two of the screw members 37 disposed on the front side. More specifically, as can be seen in FIGS. 5 and 11, the joint bracket 70 includes a supporting seat 71 which is brought into abutment with the underside of a front region of the flange 43 of the inflator 40, a pair of mounting legs 72 which extend downwardly from left and right end areas of the supporting seat 71, and a pair of mounting seats 73 which are disposed at the lower ends of the mounting legs 72 and bolt fastened to a predetermined mounting bracket extending from the not-shown dashboard reinforcement. The supporting seat 71 includes, in a vicinity of each of the left and right ends, a through hole 71a for receiving the screw member 37 disposed on the front side. If the supporting seat 71 is fastened to the underside of the front region of the flange 43 of the inflator 40 with the screw members 37 and nuts 38, the joint bracket 70 as well as the inflator 40 are mounted on the bag holder 20.

Assembling of the airbag device M is now described. The airbag 10 is firstly prepared by joining the joint section 15 to the periphery 13 of the inlet port 12 of the bag body 11, as shown in FIG. 8. Then the airbag 10 is folded up into an airbag package 18, a generally rectangular parallelepiped. The airbag package 18 is then wrapped by a not-shown, tearable wrapping sheet for keeping the folded-up configuration. At this time, the joint section 15 is kept unbound by the wrapping sheet.

Subsequently, as can be seen in (A) and (B) of FIG. 9 and (A) and (B) of FIG. 10, the gas guide tube 30 of the bag holder 20 is put into the airbag 10 via the inlet port 12 until the bottom surface 18a of the airbag package 18 abuts against the upper surface 21a of the support board 21.

When the gas guide tube 30 is inserted into the airbag 10, a folded region 18b of the airbag package 18 is pushed upward by the upper end 33 of the gas guide tube 30, such that a void space (or a dent) 18c is formed inside the gas guide tube 30, as can be seen in FIGS. 2 and 3. It will be understood that a space for accommodating the gas guide tube 30 may be formed in advance in a folding process of the airbag 10. The space in this instance may be smaller than the void space 18c of the illustrated embodiment.

Thereafter, as shown in (B) and (C) of FIG. 9, (B) of FIG. 10 and (A) of FIG. 11, the joint tongues 17 of the joint section 15 of the airbag 10 are brought into engagement with the screw members 37 by putting the screw members 37 through the retaining holes 17a. Then as shown in (A) and (B) of FIG. 11, the body 41 of the inflator 40 is inserted into the gas guide tube 30 of the bag holder 20 via the insert opening 28 such that the screw members 37 go through the through holes 44 of the flange 43, the body 41 of the inflator 40 is disposed inside the gas guide tube 30 and the flange 43 abuts against the support board 21 of the bag holder 20. At this time, the leading end regions of the joint tongues 17 of the joint section 15 are sandwiched between the flange 43 and the support board 21.

At this time, the supporting seat 71 of the joint bracket 70 is brought into abutment with the underside of the front region the flange 43 of the inflator 40 such that the screw members 37 go through the through holes 71a of the supporting seat 71 as well.

If then the screw members 37 are fastened with the nuts 38, the airbag 10, the inflator 40, and the joint bracket 70 are coupled with the bag holder 20, and an airbag module 80, which is composed of the airbag 10, the bag holder 20, the inflator 40 and the joint bracket 70, is formed.

Thereafter, the airbag module 80 is coupled with the airbag cover 50. Specifically, the airbag module 80 is put inside the side wall 56 of the airbag cover 50 such that the retaining hooks 24 extending from the support board 21 of the bag holder 20 go through the retaining holes 62 of the side wall 56 of the airbag cover 50 and the left and right joint tongues 26 extending from the support board 21 abut against the mounting seats 64 of the airbag cover 50. Then the screws 65 are inserted into the insert holes 26a of the joint tongues 26 and insert holes 64a of the mounting seats 64 and fastened with nuts 66. Thus the airbag cover 50 is coupled with the bag holder 20 and the airbag device M is completed.

Thereafter, the airbag device M is jointed to the mounting brackets extending from the dashboard reinforcement of the vehicle V through the use of the joint brackets 70, the inflator 40 is connected to lead wires extending from a not-shown control device for actuating the airbag device M, and the dashboard 1 is mounted on the vehicle V. Thus the airbag device M for a passenger seat is mounted on the vehicle V.

Figure 12:
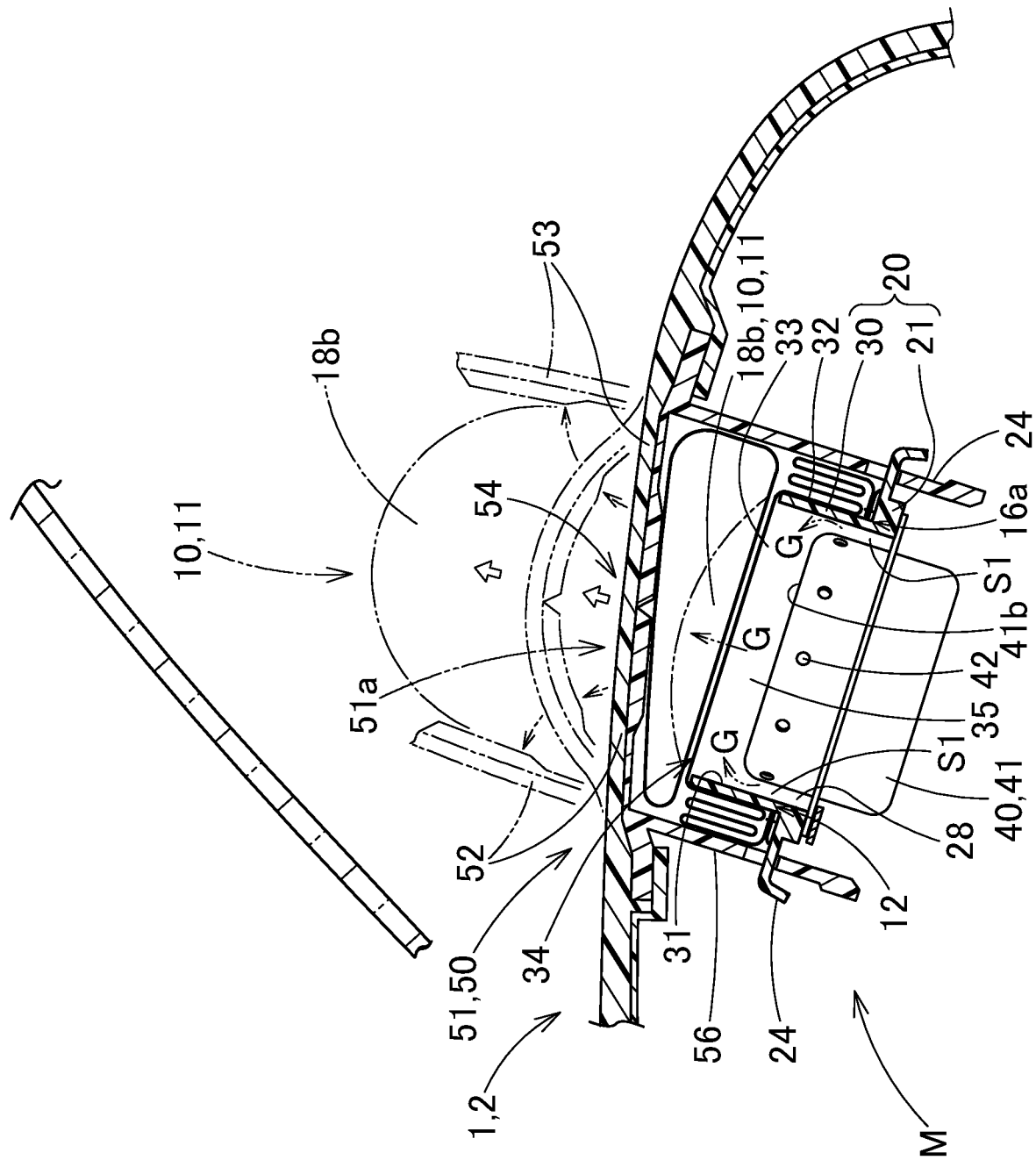
FIGS. 12 and 13 illustrate a deployment behavior of the airbag of the embodiment in schematic vertical sectional views.
Figure 13:
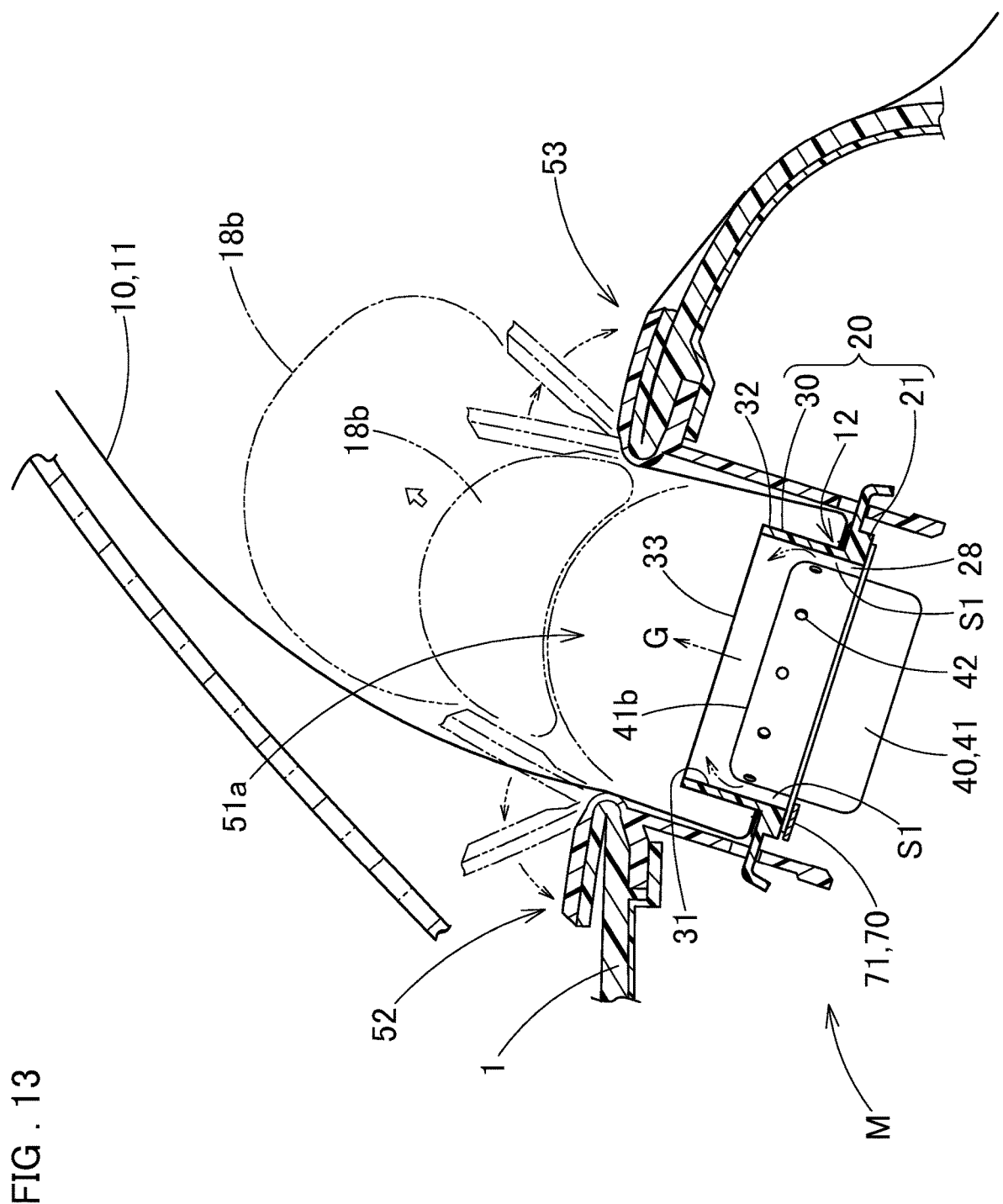

After the airbag device M is mounted on the vehicle V, if the inflator 40 is fed with an actuating signal, the inflator 40 will emit an inflation gas G from the outlet ports 42 into the airbag 10, and the airbag 10 fed with the inflation gas G will break the wrapping sheet and push and open the doors 52 and 53 of the airbag cover 50, emerge from an opening 51a formed by opening of the doors 52 and 53, and be deployed rearward as shown in FIG. 1 (double-dotted lines) and FIGS. 12 and 13.

Figure 14:
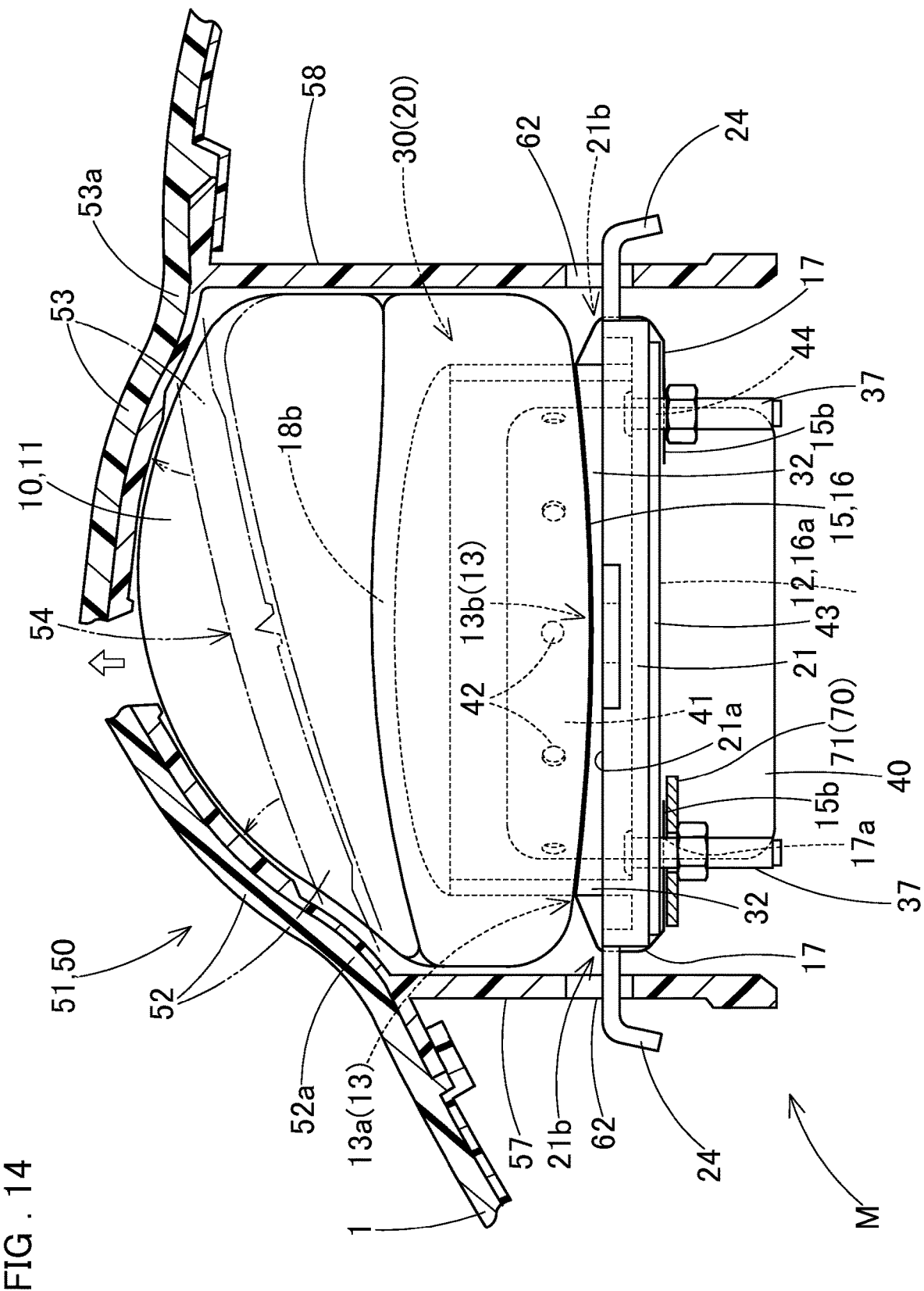
FIG. 14 illustrates the way an inlet port of the airbag is substantially constricted.

More specifically, in the airbag device M of the illustrated embodiment, as can be seen in FIGS. 12, 13 and 14, when an inflation gas G is emitted from the gas outlet ports 42 of the inflator 40, the gas G passes by the upper end (or top face) 41b of the body 41 of the inflator 40 and flows towards the airbag cover 50 inside the gas guide tube 30 (inside the inner circumference 31 of the gas guide tube 30) of the bag holder 20, and once fills a space (gas reservoir) 35 defined by the inner circumference 31 of the gas guide tube 30, the top face 41b of the body 41 of the inflator 40 and the upper end 33 of the gas guide tube 30. When more inflation gas G is emitted from the inflator 40, the gas G pushes up the folded region 18b of the airbag 10 disposed above the opening 34 of the gas guide tube 30, as shown in FIG. 12.

The folded region 18b as pushed up then opens the doors 52 and 53 of the airbag cover 50, emerges from the opening 51a formed by opening of the doors 52 and 53 (FIG. 13), then the airbag unfolds and is deployed as shown in FIG. 1 (double-dotted lines) and FIG. 13.

Since the gas guide tube 30 of the bag holder 20 is fitted in the inlet port 12 of the airbag 10 in a tight-fitted fashion, the gas guide tube 30 lids the inlet port 12 and prevents gas leakage from the inlet port 12 at airbag deployment. Further, the joint section 15 of the airbag 10, which is disposed in the bottom surface 18a of the airbag package 18, is joined to the support board 21 of the bag holder 20 through the use of the screw members 37, thus prevented from being detached from the support board 21. With this configuration, at airbag deployment, although the inlet port 12 of the airbag 10 may move in a direction away from the support board 21 to some extent, it merely slides on the outer circumference 32 of the gas guide tube 30 and stays closed off by the gas guide tube 30, thus a gas leakage is prevented. Moreover, the gas guide tube 30 extends farther towards the airbag cover 50 than the upper end of the inflator body 41 as fitted in the inlet port 12, in other words, the gas guide tube 30 has a greater height from the support board 21 than the inflator body 41. This configuration will prevent the inlet port 12 from slipping off from the gas guide tube 30. Accordingly, a gas leakage from the inlet port 12 will be prevented adequately, and a gas sealing property of the inlet port 12 of the airbag 10 will be ensured with a simple configuration.

That is, in the illustrated embodiment, the gas sealing property of the airbag 10 is ensured by the tight-fitting of the gas guide tube 30 of the bag holder 20 into the inlet port 12, and the joint of the bottom surface 18a of the airbag 10 as folded to the support board 21 of the bag holder 20, With respect to the joint between the airbag and bag holder, it is not necessary to join and seal a whole periphery 13 of the inlet port 12 to the support board 21, but the airbag 10 has only to be joined to the support board 21 by a part of the bottom surface 18a so as not to be separated from the support board 21 considerably. Accordingly, the joint may also be composed of binding the support board 21 by a suitable strap or belt, by way of example, other than the engagement of the joint tongues 17 with the support board 21 as in the illustrated embodiment.

The configuration that the gas guide tube 30 is greater in height than the inflator body 41 as inserted into the inlet port 12 and surrounds the outer circumference 41c of the inflator body 41 enhances a heat resistance of the airbag 10 because an inflation gas G exiting the gas outlet ports 42 of the inflator 40 does not hit the airbag 10 directly but hits the inner circumference 31 of the gas guide tube 30 first.

Therefore, the airbag device M of the illustrated embodiment has a simple and gas-tight connection between the airbag 10 and bag holder 20 made from synthetic resin. The airbag 10 is also enhanced in heat resistance.

In the airbag device M of the illustrated embodiment, the support board 21 of the bag holder 20 is further provided with the reinforcing ribs 25 for enhancing bending rigidity (FIGS. 6 and 7).

The reinforcing ribs 25 provide the support board 21 of the bag holder 20 with high bending rigidity, such that the support board 21 will support the bottom surface 18a of the airbag 10 as folded steadily and steady an airbag deployment.

In the airbag device M of the illustrated embodiment, moreover, the joint section 15 of the airbag 10 is configured such that the root region 15a is joined to the periphery 13 of the inlet port 12 in the bottom surface 18a of the airbag 10 as folded. The joint section 15 includes a plurality of (four, in the illustrated embodiment) leading end regions 15b which are joined to the support board 21 at more than one positions in a vicinity of the inlet port 12 of the airbag 10.

With this configuration, when the airbag 10 is inflated with an inflation gas G and the inlet port 12 slides on the outer circumference 32 of the gas guide tube 30 in a direction away from the support board 21 at airbag deployment, as shown in FIG. 14, the joint section 15, which is joined to the support board 21 by the leading ends 15b, pulls the periphery 13 of the inlet port 12. This forms, in the periphery 13 of the inlet port 12, a removed region 13a which is removed from the support board 21 and an approximate region 13b which is close to the support board 21, such that a circumferential length of the periphery 13 of the inlet port 12 is lengthened and the inner circumference of the inlet port 12 is substantially pulled and constricted. As a consequence, the periphery 13 of the inlet port 12 is further pressed against the outer circumference 32 of the gas guide tube 30. That is, the joint section 15 of the airbag 10 pulls the periphery 13 of the inlet port 12 further towards the outer circumference 32 of the gas guide tube 30, thereby improving the gas sealing property of the inlet port 12.

In the illustrated embodiment, moreover, the inflator 40 includes the flange 43 that protrudes from the outer circumference 41c of the body 41. The bag holder 20 includes a plurality of (four, in the illustrated embodiment) the screw members 37 that protrude downwardly from the periphery of the insert opening 28 of the support board 21. The screw members 37 are each in engagement with the leading end regions 15b of the joint section 15 of the airbag 10 and passed through the flange 43, and fastened with the nuts 38. Thus the airbag 10 (particularly, the joint section 15) and the bag holder 20 (particularly, the support board 21) as well as the inflator 40 (particularly, the flange 43) and the bag holder 20 (particularly, the support board 21) are coupled together.

In the illustrated embodiment, when the joint section 15 of the airbag 10 is coupled with the support board 21 of the bag holder 20 during an assembling work of the airbag device M, the joint section 15 is firstly brought into engagement with the screw members 37, then the screw members 37 are passed through the flange 43 of the inflator 40 and fastened with the nuts 38. Thus the airbag 10 (particularly, the joint section 15) and the support board 21 as well as the inflator 40 and support board 21 are coupled together. That is, the screw members 37 are used for joint of the airbag 10 to the support board 21 of the bag holder 20 as well as for joint of the inflator 40 to the bag holder 20, which simplifies the configuration of the airbag device M, and improves efficiency in assembling work of the airbag device M.

If such an advantageous effect does not have to be considered, the leading end regions 15b of the joint section 15 may be each coupled with a separate joint member 27 formed on the underside of the support board 21, as indicated with double-dotted lines in (C) of FIG. 9.

When the leading end regions 15b of the joint section 15 are joined to the support board 21 at more than one positions around the inlet port 12 of the airbag 10, such joint members for engagement with the joint section 15 are desirably formed on the underside of the support board 21 because the support board 21 supports the airbag 10 with the upper surface 21a. Such a joint member would be composed of a member for engagement with a retaining hole (such as the retaining hole 17a of the illustrated embodiment) or a mounting hole formed in each of the leading end regions 15b of the joint section 15, or a member for bolt fastening the leading end region 15b. Alternatively, each of the leading end regions 15b of the joint section 15 may be formed into such a string or a belt that binds the support board 21 on both sides of the insert opening 28 in order to couple the airbag 10 with the bag holder 20.

As long as the inner circumference of the inlet port 12 is able to stay gas tight with respect to the outer circumference 32 of the gas guide tube 30 even when sliding on the outer circumference 32 at airbag deployment, the root region 15a of the joint section 15 may be joined to a portion of the bottom surface 18a of the airbag 10 removed from the periphery 13 of the inlet port 12, or to a portion of a side 18d (see (A) of FIG. 10) of the airbag package 18 in a vicinity of the bottom surface 18a. In other words, on condition that the bottom surface 18a of the airbag 10 is kept attached to the upper surface 21a of the support board 21 at airbag deployment, the joint section 15 would not necessarily have to be joined to the bottom surface 18a of the airbag package 18 (i.e. the airbag 10 as folded up), but may be joined to the side 18d of the airbag package 18 in the vicinity of the bottom surface 18a.

The invention has been illustrated as embodied into an airbag device M for a passenger seat. However, the invention can be applied to any airbag devices in which a body of an inflator is inserted into an inlet port of a folded airbag, and the airbag is supported by a bag holder on the bottom surface and is coupled with the bag holder, the bag holder including an insert opening for receiving the body of the inflator and being coupled with and holding the inflator. By way of example, the invention may be applied to an airbag device for a driver's seat, an airbag device for knee protection, or the like.

What is claimed is:

1. An airbag device mountable on a vehicle, comprising:
   an airbag that is folded up and inflatable with an inflation gas, the airbag including a generally round inlet port for taking in the inflation gas, the inlet port being disposed in a bottom surface of the airbag as folded, the airbag further including a joint section that is disposed in a vicinity of the bottom surface of the airbag as folded;
   an inflator for feeding the airbag with the inflation gas, the inflator including a pot-shaped body and a plurality of gas outlet ports that are disposed on an outer circumference of an upper region of the body, the upper region of the body being fitted in the inlet port of the airbag;
   an airbag cover that covers the airbag and includes a door which is openable so as to permit emergence of the airbag; and
   a bag holder that is formed from synthetic resin and supports the airbag, the bag holder being coupled with the inflator and comprising:
      a support board that supports the bottom surface of the airbag including a periphery of the inlet port and is coupled with the joint section of the airbag;
      an insert opening that is disposed in the support board for receiving the upper region of the body of the inflator from below such that the upper region is further inserted into the inlet port of the airbag; and
      a generally tubular gas guide tube that extends upward towards the airbag cover from a periphery of the insert opening, the gas guide tube being fitted into the airbag via the inlet port and covering the outer circumference of the upper region of the body of the inflator at a distance such that the inflation gas exiting the gas outlet ports of the inflator is allowed to flow upward, the gas guide tube being greater in height than the upper region of the body of the inflator, wherein
      the gas guide tube is formed into a circular tube that encircles an entirety of the outer circumference of the upper region of the body of the inflator, and an entirety of an upper end of the gas guide tube is higher than the upper region of the body of the inflator, and
      the gas guide tube has an outer diameter such that the gas guide tube is tightly fitted in the inlet port and lids the inlet port.

2. The airbag device of claim 1, wherein the bag holder further includes a reinforcing rib that is disposed in the support board for enhancing a bending rigidity of the support board.

3. The airbag device of claim 1, wherein the joint section of the airbag includes a root region that is joined to the periphery of the inlet port of the airbag and a plurality of leading end regions which are joined to the support board at more than one position in a vicinity of the inlet port of the airbag.

4. The airbag device of claim 3, wherein:
   the inflator further includes a flange that protrudes from the outer circumference of the body;
   the bag holder further includes a plurality of screw members that protrude downwardly from the periphery of the insert opening of the support board; and
   the screw members are each in engagement with the leading end regions of the joint section of the airbag and go through the flange, and fastened with nuts such that the inflator and the support board of the bag holder as well as the airbag and the support board of the bag holder are coupled together.

5. The airbag device of claim 1,
   wherein the joint section of the airbag includes a root region that is joined to the periphery of the inlet port of the airbag and a plurality of leading end regions which are joined to the support board at more than one position in a vicinity of the inlet port of the airbag,
   wherein an intermediate region of the joint section disposed between the root region and each leading end region of the plurality of leading end regions is bent so as to wrap an outer edge of the support board.

6. The airbag device of claim 1,
   wherein the joint section of the airbag includes a root region that is joined to the periphery of the inlet port of the airbag and a plurality of leading end regions which are joined to the support board at more than one position in a vicinity of the inlet port of the airbag,
   wherein the support board of the bag holder includes a plurality of retaining hooks that extend outwardly for engagement with the airbag cover, and a plurality of screw members that are disposed around the insert opening and protrude downwardly for jointing the inflator to the support board,
   wherein each leading end region of the plurality of leading end regions is placed between adjacent retaining hooks of the plurality of retaining hooks and brought into engagement with a corresponding screw member of the plurality of screw members.

7. The airbag device of claim 6, wherein an intermediate region of the joint section disposed between the root region and each leading end region of the plurality of leading end regions is bent so as to wrap an outer edge of the support board.

8. An airbag device mountable on a vehicle, comprising:
   an airbag that is folded up and inflatable with an inflation gas, the airbag including a generally round inlet port for taking in the inflation gas, the inlet port being disposed in a bottom surface of the airbag as folded, the airbag further including a joint section that is disposed in a vicinity of the bottom surface of the airbag as folded;

an inflator for feeding the airbag with the inflation gas, the inflator including a pot-shaped body and a plurality of gas outlet ports that are disposed on an outer circumference of an upper region of the body, the upper region of the body being fitted in the inlet port of the airbag;

an airbag cover that covers the airbag and includes a door which is openable so as to permit emergence of the airbag; and a bag holder that is formed from synthetic resin and supports the airbag, the bag holder being coupled with the inflator and comprising:

a support board that supports the bottom surface of the airbag including a periphery of the inlet port and is coupled with the joint section of the airbag;

an insert opening that is disposed in the support board for receiving the upper region of the body of the inflator from below such that the upper region is further inserted into the inlet port of the airbag; and a generally tubular gas guide tube that extends upward towards the airbag cover from a periphery of the insert opening, the gas guide tube being fitted into the airbag via the inlet port and covering the outer circumference of the upper region of the body of the inflator at a distance such that the inflation gas exiting the gas outlet ports of the inflator is allowed to flow upward, the gas guide tube being greater in height than the upper region of the body of the inflator, wherein the joint section of the airbag includes a root region that is joined to the periphery of the inlet port of the airbag and a plurality of leading end regions which are joined to the support board at more than one position in a vicinity of the inlet port of the airbag, wherein an intermediate region of the joint section disposed between the root region and each leading end region of the plurality of leading end regions is bent so as to wrap an outer edge of the support board.

9. An airbag device mountable on a vehicle, comprising:
an airbag that is folded up and inflatable with an inflation gas, the airbag including a generally round inlet port for taking in the inflation gas, the inlet port being disposed in a bottom surface of the airbag as folded, the airbag further including a joint section that is disposed in a vicinity of the bottom surface of the airbag as folded;

an inflator for feeding the airbag with the inflation gas, the inflator including a pot-shaped body and a plurality of gas outlet ports that are disposed on an outer circumference of an upper region of the body, the upper region of the body being fitted in the inlet port of the airbag;

an airbag cover that covers the airbag and includes a door which is openable so as to permit emergence of the airbag; and a bag holder that is formed from synthetic resin and supports the airbag, the bag holder being coupled with the inflator and comprising:

a support board that supports the bottom surface of the airbag including a periphery of the inlet port and is coupled with the joint section of the airbag;

an insert opening that is disposed in the support board for receiving the upper region of the body of the inflator from below such that the upper region is further inserted into the inlet port of the airbag; and a generally tubular gas guide tube that extends upward towards the airbag cover from a periphery of the insert opening, the gas guide tube being fitted into the airbag via the inlet port and covering the outer circumference of the upper region of the body of the inflator at a distance such that the inflation gas exiting the gas outlet ports of the inflator is allowed to flow upward, the gas guide tube being greater in height than the upper region of the body of the inflator, wherein the joint section of the airbag includes a root region that is joined to the periphery of the inlet port of the airbag and a plurality of leading end regions which are joined to the support board at more than one position in a vicinity of the inlet port of the airbag, wherein the support board of the bag holder includes a plurality of retaining hooks that extend outwardly for engagement with the airbag cover, and a plurality of screw members that are disposed around the insert opening and protrude downwardly for jointing the inflator to the support board, wherein each leading end region of the plurality of leading end regions is placed between adjacent retaining hooks of the plurality of retaining hooks and brought into engagement with a corresponding screw member of the plurality of screw members.

10. The airbag device of claim 9, wherein an intermediate region of the joint section disposed between the root region and each leading end region of the plurality of leading end regions is bent so as to wrap an outer edge of the support board.

* * * * *